(12) United States Patent
Yilmaz et al.

(10) Patent No.: US 9,806,842 B2
(45) Date of Patent: Oct. 31, 2017

(54) WAVELENGTH SELECTIVE SWITCH (WSS) FOR SHAPING OPTICAL SIGNALS

(71) Applicant: Infinera Corporation, Sunnyvale, CA (US)

(72) Inventors: Omer Faruk Yilmaz, Palo Alto, CA (US); Ankur Neog, Bangalore (IN); Saurabh Kumar, Menlo Park, CA (US); Sanjeev Ramachandran, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 104 days.

(21) Appl. No.: 14/798,923

(22) Filed: Jul. 14, 2015

(65) Prior Publication Data

US 2017/0019204 A1    Jan. 19, 2017

(51) Int. Cl.
*H04B 17/00* (2015.01)
*H04J 14/02* (2006.01)

(52) U.S. Cl.
CPC ...... *H04J 14/0221* (2013.01); *H04J 14/0212* (2013.01)

(58) Field of Classification Search
CPC .... H04J 14/02; H04J 14/0221; H04J 14/0212; H04J 14/0227; H04B 10/079; H04B 10/07955; H04Q 11/0005; H04Q 11/00
See application file for complete search history.

(56) References Cited

U.S. PATENT DOCUMENTS

| 8,428,463 | B2 | 4/2013 | Warren et al. | |
|---|---|---|---|---|
| 2012/0328291 | A1* | 12/2012 | Frisken | G02B 6/356 398/48 |
| 2016/0072579 | A1* | 3/2016 | Schroeder | H04B 10/07953 398/26 |
| 2016/0323057 | A1* | 11/2016 | Barnard | H04J 14/0212 |
| 2017/0005726 | A1* | 1/2017 | Kim | H04B 10/07955 |

OTHER PUBLICATIONS

Kumar et al., "Experimental Study of Intra- vs. Inter-Superchannel Spectral Equalization in Flexible Grid Systems", Optical Fiber Communication Conference and Exposition and the National Fiber Optic Engineers Conference (OFC/NFOEC), 2013, 3 pages.
Wikipedia, "Wavelength selective switching", https://en.wikipedia.org/wiki/Wavelength_selective_switching, Jun. 24, 2015, 5 pages.

* cited by examiner

*Primary Examiner* — Tesfaldet Bocure
(74) *Attorney, Agent, or Firm* — David L. Soltz

(57) ABSTRACT

A device may perform a set of sample measurements of a set of slices of spectrum utilized by an input optical signal. The device may perform an analysis of the input optical signal to determine an attenuation profile. The analysis may include identifying a channel in a particular slice of spectrum, of the set of slices of spectrum, based on an optical power of a sample measurement, of the set of sample measurements, satisfying a threshold. The device may apply the attenuation profile to the input optical signal to generate an output optical signal with a particular spectral shape. The device may provide the output optical signal with the particular spectral shape.

19 Claims, 9 Drawing Sheets

WAVELENGTH SELECTIVE SWITCH (WSS) FOR SHAPING OPTICAL SIGNALS

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal), which may be collectively integrated onto a common semiconductor substrate.

A WDM system may also include a receiver circuit, such as a receiver (Rx) PIC, having a photodiode, and an optical demultiplexer circuit (referred to as a "demultiplexer") configured to receive the combined output and demultiplex the combined output into individual optical signals.

A WDM system may also include a set of nodes (e.g., devices of the WDM system that may be utilized to route the multiple optical signals, add another optical signal to the multiple optical signals, drop an optical signal from the multiple optical signals, or the like). During transmission of an optical signal in a WDM system, a set of intermediate nodes, such as a set of reconfigurable optical add-drop multiplexers (ROADMs), may be utilized to route and/or amplify the optical signal. For example, an optical amplifier associated with a ROADM may be utilized to overcome attenuation during optical signal transmission, thereby facilitating optical signal transmission over increased distances.

SUMMARY

According to some possible implementations, a method may include performing, by a device, a set of sample measurements of an input optical signal. The input optical signal may include a set of channels of a super-channel. The super-channel may group the set of channels for routing as a single transport entity. The set of channels may not conform to an International Telecommunication Union (ITU-T) fixed frequency grid spacing. The method may include performing, by the device, an analysis on the set of sample measurements of the input optical signal. The analysis may include identifying a channel, of the set of channels, in a sample measurement, of the set of sample measurements, based on the set of sample measurements based on an optical power of one or more sample measurements, of the set of sample measurements. The method may include determining, by the device, a spectral profile for the input optical signal based on the analysis of the set of sample measurements of the input optical signal. The method may include determining, by the device, an attenuation profile for the input optical signal based on the spectral profile for the input optical signal and a particular spectral shape. The attenuation profile may include an attenuation of the channel. The method may include applying, by the device, the attenuation profile to the input optical signal to generate an output optical signal with the particular spectral shape.

According to some possible implementations, an optical device may include a spectral shaping device. The spectral shaping device may perform a set of sample measurements of a set of slices of spectrum utilized by an input optical signal. The spectral shaping device may perform an analysis of the input optical signal to determine an attenuation profile. The analysis may include identifying a channel in a particular slice of spectrum, of the set of slices of spectrum, based on an optical power of a sample measurement, of the set of sample measurements, satisfying a threshold. The spectral shaping device may apply the attenuation profile to the input optical signal to generate an output optical signal with a particular spectral shape. The spectral shaping device may provide the output optical signal with the particular spectral shape.

According to some possible implementations, an apparatus may include a wavelength selective switch (WSS). The apparatus may apply an attenuation profile to an input optical signal to generate an output optical signal. The input optical signal may include a set of channels with a set of optical powers differing by at least a threshold quantity. The output optical signal may be associated with the set of channels with the set of optical powers not differing by the threshold quantity. The apparatus may transmit the output optical signal. The apparatus may include an optical power monitor (OPM) located downstream of the WSS in an optical transmission path. The apparatus may perform a set of sample measurements of the output optical signal. The apparatus may include a processor. The apparatus may determine a spectral profile for the input optical signal based on the set of sample measurements of the output optical signal. The apparatus may generate the attenuation profile for the WSS based on the spectral profile. The apparatus may provide the attenuation profile to the WSS for application to another input optical signal.

DETAILED DESCRIPTION

Figure 1:
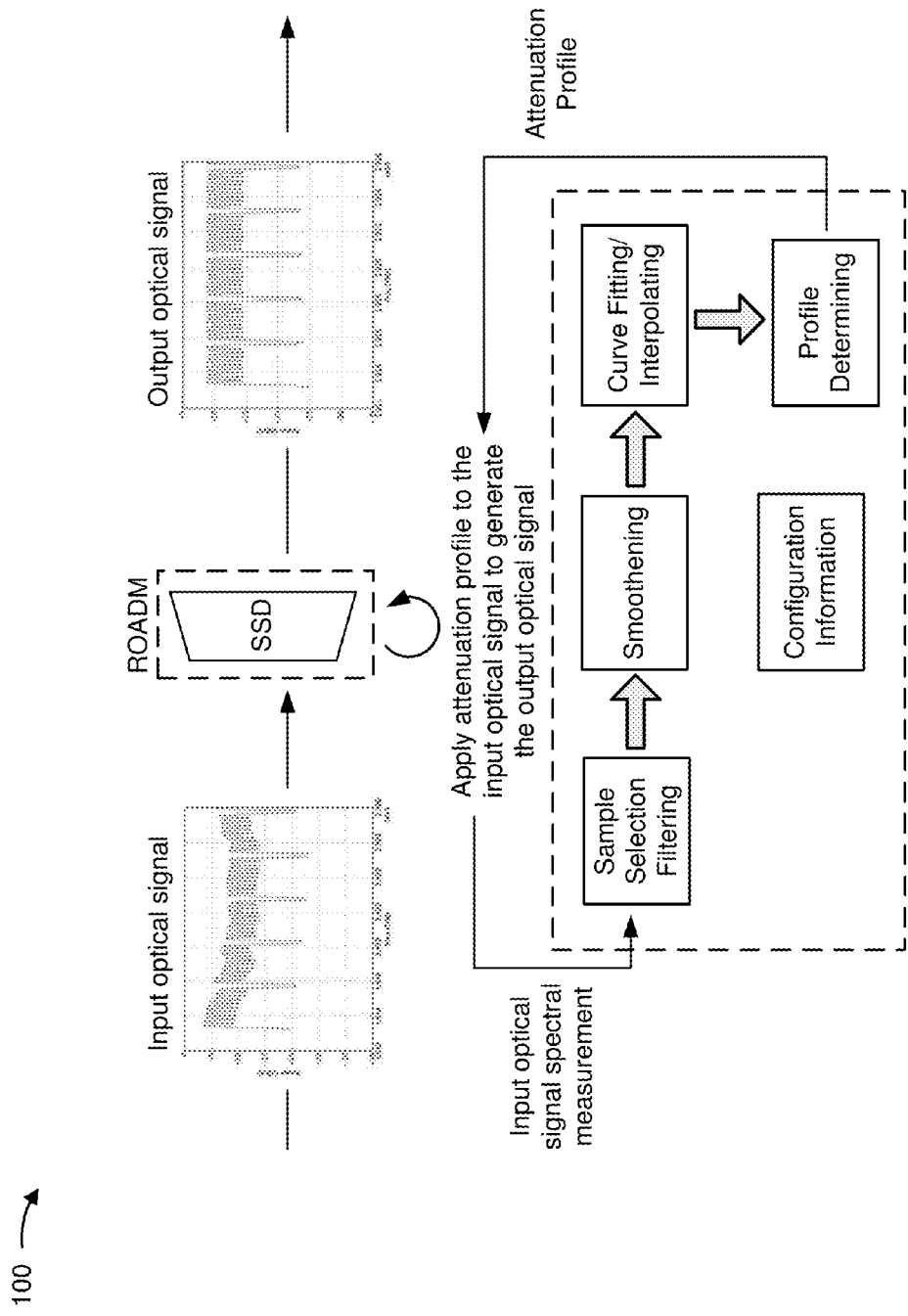
FIG. 1 is a diagram of an overview of an example implementation described herein.

The following detailed description of example implementations refers to the accompanying drawings. The same reference numbers in different drawings may identify the same or similar elements.

An optical transmitter associated with a wavelength division multiplexed (WDM) optical communication system may transmit multiple optical signals via a single optical communication path using an optical multiplexer circuit. The optical transmitter may provide the multiple optical signals using one or more wavelengths via one or more super-channels. A super-channel may refer to a group of optical carriers (e.g., channels) that are routed as a single transport entity. The optical transmitter may transmit the one or more super-channels to an intermediate node that routes the one or more super-channels to a receive node that includes an optical receiver. The intermediate node may include a reconfigurable optical add-drop multiplexer (ROADM) that may add an optical signal to the one or more super-channels, drop an optical signal from the one or more super-channels, or the like.

During transmission of an optical signal via an optical communication path (e.g., an optical fiber, a link, or the like), the optical signal may be subject to attenuation. As transmission distance is increased, the optical signal may be attenuated to an extent that a decreased signal to noise ratio (SNR) hinders utilization of the optical signal to carry information. An intermediate node of the optical communication path may include an optical amplifier that optically amplifies the optical signal to overcome attenuation. However, the optical amplifier may not amplify the optical signal uniformly. For example, the optical amplifier may amplify a first carrier to a first optical power and a second carrier to a second optical power. As a consequence, after one or more amplifications, different carriers may incur different levels of noise accumulation.

A fixed attenuation profile may be utilized to perform spectral shaping on an optical signal. The fixed attenuation profile may indicate an attenuation to be performed on each wavelength of a set of wavelengths (each wavelength corresponding to a channel of the optical signal). However, some WDM systems utilize a flexible wavelength grid or a non-standard wavelength grid for assigning channels (a standard wavelength grid being defined by the International Telecommunication Union (ITU-T) fixed frequency channel spacing grid (ITU-T G.694.2)), thereby resulting in a mismatch between the fixed attenuation profile and the wavelengths being utilized for channels of the optical signal.

Implementations, described herein, may utilize a spectral shaping device, which includes a wavelength selective switch (WSS), to perform spectral shaping using flexible selective attenuation of an optical signal, thereby avoiding excessive noise accumulation. In this way, SNR may be increased for an optical signal, potential transmission distance may be increased for the optical signal, or the like relative to an optical signal for which spectral shaping is not performed.

FIG. 1 is a diagram of an overview of an example implementation 100 described herein. As shown in FIG. 1, a ROADM may include a spectral shaping device (SSD). The spectral shaping device receives an input optical signal that is associated with a particular spectral profile. A spectral profile may refer to a representation of a set of optical power measurements for an optical signal at a set of wavelengths of the optical signal. A peak of the spectral profile may represent a center wavelength for a channel of the optical signal. A group of peaks of the spectral profile may represent a super-channel of the optical signal. The spectral shaping device may perform one or more sample measurements on the optical signal to determine the spectral profile of the optical signal. For example, the spectral shaping device may perform a coarse-scan measurement, a fine-scan measurement, or the like. Coarse may refer to a resolution greater than 3.125 Gigahertz (GHz) and approximately 12.5 GHz. Fine may refer to a resolution less than 12.5 GHz and approximately 3.125 GHz.

As further shown in FIG. 1, the spectral shaping device may perform one or more analysis techniques on the one or more spectral measurements. For example the spectral shaping device may apply a sample selection filter technique to identify channels being utilized for transmission and channels not being utilized for transmission. In this way, the spectral shaping device may account for a flexible grid, a poorly calibrated transmitter, or the like. Additionally, or alternatively, the spectral shaping device may apply a smoothening technique, a curve fitting technique, an interpolation technique, or the like to generate the spectral profile based on the one or more spectral measurements. In this way, the spectral shaping device may account for errors in the one or more spectral measurements, unused channels, or the like.

The spectral shaping device may determine an attenuation profile based on the one or more analysis techniques, configuration information, or the like. The attenuation profile may refer to a set of attenuation levels that are to be applied to a corresponding set of wavelengths of the optical signal. For example, the attenuation profile may indicate that a first wavelength is to be attenuated to a first optical power and a second wavelength is to be attenuated to a second optical power.

The attenuation profile may be associated with a desired spectral shape for an output optical signal. For example, the attenuation profile may be associated with causing the output optical signal to resemble a flat spectral profile, a non-flat spectral profile, such as a pre-emphasis spectral profile, or the like. A flat spectral profile may refer to a spectral shape for which an approximate optical power for each super-channel is approximately equal (e.g., inter-super-channel equalization) and/or for which an approximate optical power for each channel of a particular super-channel is approximately equal (e.g., intra-super-channel equalization). A pre-emphasis (e.g., a non-flat) spectral profile may refer to a spectral shape for which a particular channel or super-channel is associated with a greater optical power than another channel or super-channel and may be utilized when the particular channel or super-channel is known to be attenuated more than the other channel or super-channel during optical transmission.

As further shown in FIG. 1, the spectral shaping device may apply the attenuation profile to the input optical signal to generate an output optical signal. For example, a WSS of the spectral shaping device may attenuate one or more wavelengths by one or more attenuation quantities to generate the output optical signal. As shown, the output optical signal is associated with a flat spectral profile in which each super-channel is associated with an approximately equal average optical power and each channel is associated with an approximately equal peak optical power. In another example, the WSS may apply another attenuation profile to the input optical to generate an output optical signal associated with another spectral shape, such as for selective pre-emphasis or the like.

In this way, the spectral shaping device may perform spectral shaping on an optical signal, thereby improving optical communications (e.g., by improving SNR after one or more amplifications, increasing potential transmission distance, or the like) relative to an optical signal that is not shaped.

Figure 2A:
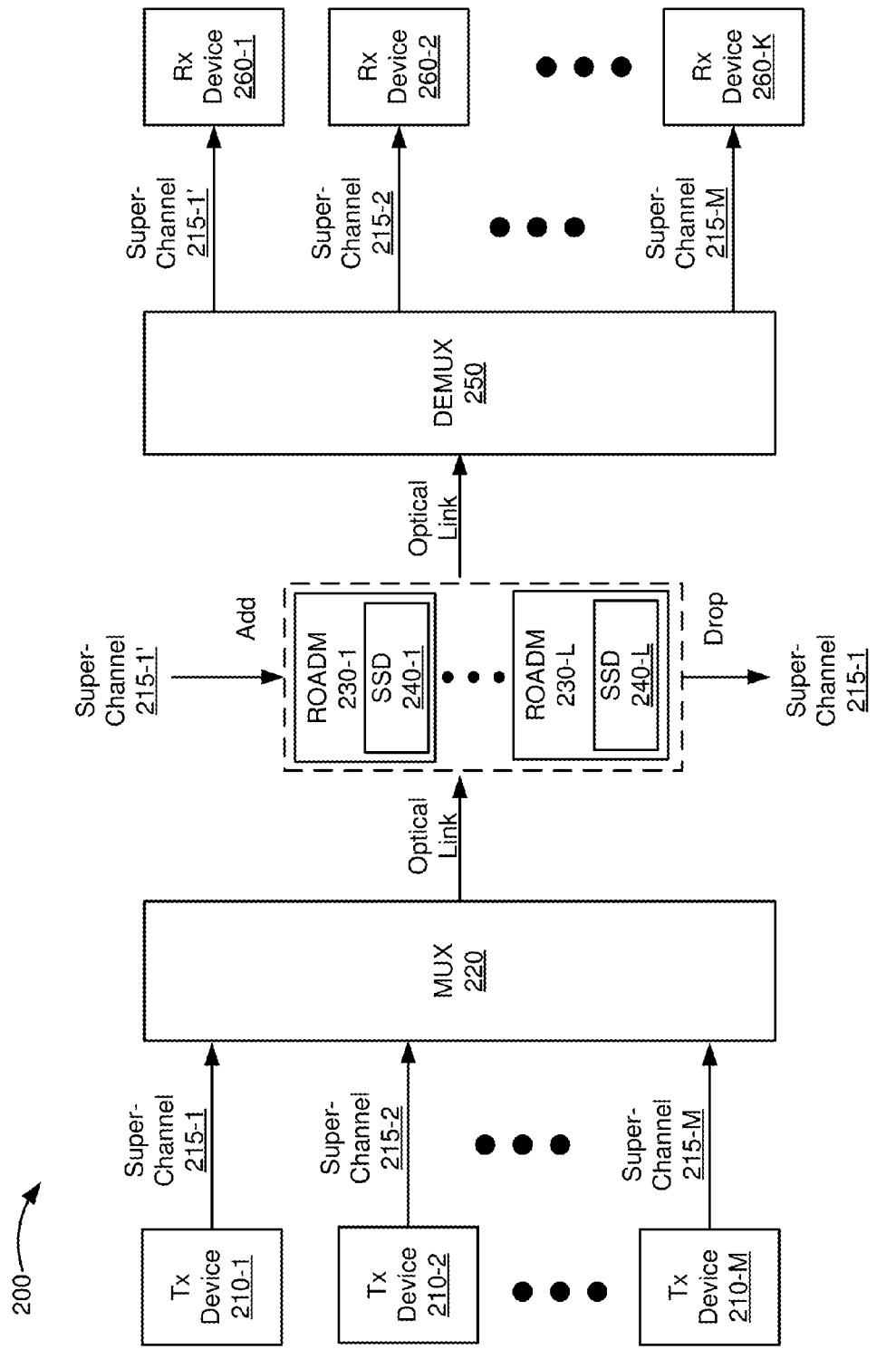
FIGS. 2A-2C are diagrams of an example environment in which systems and/or methods, described herein, may be implemented.

FIG. 2A is a diagram of example devices of a network 200 that may be designed, monitored, and/or configured according to implementations described herein. One or more devices shown in FIG. 2A may operate within network 200, and may correspond to one or more network devices and/or one or more optical components of a network device. As shown, network 200 may include a set of optical transmitter devices 210-1 through 210-M (M≥1) (hereinafter referred to individually as "Tx device 210," and collectively as "Tx devices 210"), a set of super-channels 215-1 through 215-M (M≥1) (hereinafter referred to individually as "super-channel 215," and collectively as "super-channels 215"), a multiplexer ("MUX") 220, a set of ROADMs 230-1 through 230-L (L≥1) (hereinafter referred to individually as "ROADM 230," and collectively as "ROADMs 230"), a set of spectral shaping devices 240-1 through 240-L (hereinafter referred to individually as "spectral shaping device 240," and collectively as "spectral shaping devices 240"), a demultiplexer ("DEMUX") 250, and a set of optical receiver devices 260-1 through 260-K (K≥1) (hereinafter referred to individually as "Rx device 260," and collectively as "Rx devices 260").

Tx device 210 may include, for example, an optical transmitter and/or an optical transceiver that generates an optical signal when a voltage or current is applied. For example, Tx device 210 may include one or more integrated circuits, such as a transmitter photonic integrated circuit (PIC), an application specific integrated circuit (ASIC), or the like. In some implementations, Tx device 210 may include a laser associated with each wavelength, a digital signal processor to process digital signals, a digital-to-analog converter to convert the digital signals to analog signals, a modulator to modulate the output of the laser, and/or a multiplexer to combine each of the modulated outputs (e.g., to form a combined output or WDM signal). One or more optical signals may be carried as super-channel 215. In some implementations, a single Tx device 210 may be associated with a single super-channel 215. In some implementations, a single Tx device 210 may be associated with multiple super-channels 215, or multiple Tx devices 210 may be associated with a single super-channel 215.

Super-channel 215 may include multiple channels (e.g., optical signals) multiplexed together using wavelength-division multiplexing to increase transmission capacity. For example, super-channel 215 may include several optical carriers or optical signals, each having a different wavelength, that are combined to provide a composite optical signal that can be switched, routed, or directed through an optical network, such as network 200, as a single optical signal or channel. Various quantities of channels may be combined into super-channels using various modulation formats to create different super-channel types having different characteristics. Various quantities of subcarriers may be combined into channels using various modulation formats. In some implementations, an optical link may include a super-channel group. A super-channel group may include multiple super-channels multiplexed together using wavelength-division multiplexing to increase transmission capacity. Examples of super-channels 215 will be described herein with respect to FIG. 2B.

Multiplexer 220 may include, for example, an optical multiplexer (e.g., a power multiplexer, a WSS-based multiplexer, a multi-cast multiplexer, or the like) that combines multiple input super-channels 215 for transmission via an output fiber. For example, multiplexer 220 may combine super-channels 215-1 through 215-M, and may provide the combined super-channels 215 to ROADM 230 via an optical link (e.g., a fiber).

ROADM 230 may include, for example, an optical add-drop multiplexer (OADM), a ROADM, a flexibly reconfigurable optical add-drop multiplexer (FROADM), or the like. ROADM 230 may multiplex, de-multiplex, add, drop, and/or route multiple super-channels 215 into and/or out of a fiber (e.g., a single mode fiber). As illustrated, a particular ROADM 230, of the set of ROADMs 230, may drop super-channel 215-1 from a fiber, and may allow super-channels 215-2 through 215-M to continue propagating toward Rx device 260 and/or another ROADM 230. Dropped super-channel 215-1 may be provided to a device (not shown) that may demodulate and/or otherwise process super-channel 215-1 to output the data stream carried by super-channel 215-1. As further shown, ROADM 230 may add super-channel 215-1' to the fiber. Super-channel 215-1' and super-channels 215-2 through 215-M may propagate to demultiplexer 250 and/or another ROADM 230. ROADM 230 may include, for example, an optical amplification device facilitating an increase in transmission distance of an optical signal, a spectral shaping device facilitating selective attenuation of an optical signal, or the like. A network including multiple ROADMs 230 is described in more detail herein in connection with FIG. 2C.

Spectral shaping device 240 may include, for example, an optical device or apparatus, such as a wavelength selective switch, that performs spectral shaping on an optical signal, such as an optical signal of super-channel 215. For example, spectral shaping device 240 may be associated with receiving an input optical signal with a first spectral shape and applying an attenuation profile to the input optical signal, thereby generating an output optical signal with a second spectral shape. In some implementations, spectral shaping device 240 may attenuate the input optical signal to generate a flat spectral profile, a non-flat spectral profile (e.g., a spectral profile for selective pre-emphasis), or the like. Components of spectral shaping device 240 will be described in more detail herein in connection with FIG. 3 and FIG. 4.

In some implementations, spectral shaping device 240 may be included with a ROADM 230 that is utilized as an intermediate node of network 200. Additionally, or alternatively, spectral shaping device 240 may be included with another network device of network 200, such as multiplexer 220, demultiplexer 250, or the like. Additionally, or alternatively, spectral shaping device 240 may be included in network 200 separate from other network devices of network 200.

Demultiplexer 250 may include, for example, an optical de-multiplexer (e.g., a power demultiplexer, a WSS-based demultiplexer, or the like) that separates multiple super-channels 215 carried over an input fiber. For example, demultiplexer 250 may separate super-channels 215-1' and super-channels 215-2 through 215-M, and may provide each super-channel 215 to a corresponding Rx device 260.

Rx device 260 may include, for example, an optical receiver and/or an optical transceiver that generates an electrical signal based on a received optical signal. For example, Rx device 260 may include one or more integrated circuits, such as a receiver PIC, an ASIC, or the like. In some implementations, Rx device 260 may include a demultiplexer to receive combined output and demultiplex the combined output into individual optical signals, a photodetector to convert an optical signal to a voltage signal, an analog-to-digital converter to convert voltage signals to digital signals, and/or a digital signal processor to process the digital signals. One or more optical signals may be received by Rx device 260 via super-channel 215. Rx device 260 may convert a super-channel 215 into one or more electrical signals, which may be processed to output information associated with each data stream carried by an optical channel included in super-channel 215. In some implementations, a single Rx device 260 may be associated with a single super-channel 215. In some implementations, a single Rx device 260 may be associated with multiple super-channels 215, or multiple Rx devices 260 may be associated with a single super-channel 215.

One or more devices shown in FIG. 2A may correspond to a single network device of network 200. In some implementations, a combination of devices shown in FIG. 2A may correspond to a single network device of network 200. For example, Tx devices 210-1 through 210-M and multiplexer 220 may correspond to a single network device. As another example, Rx devices 260-1 through 260-K and demultiplexer 250 may correspond to a single network device.

The number and arrangement of devices shown in FIG. 2A are provided as an example. In practice, there may be additional devices, fewer devices, different devices, or differently arranged devices, included in network 200, than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices shown in FIG. 2A may perform one or more functions described as being performed by another set of devices shown in FIG. 2A.

Figure 2B:
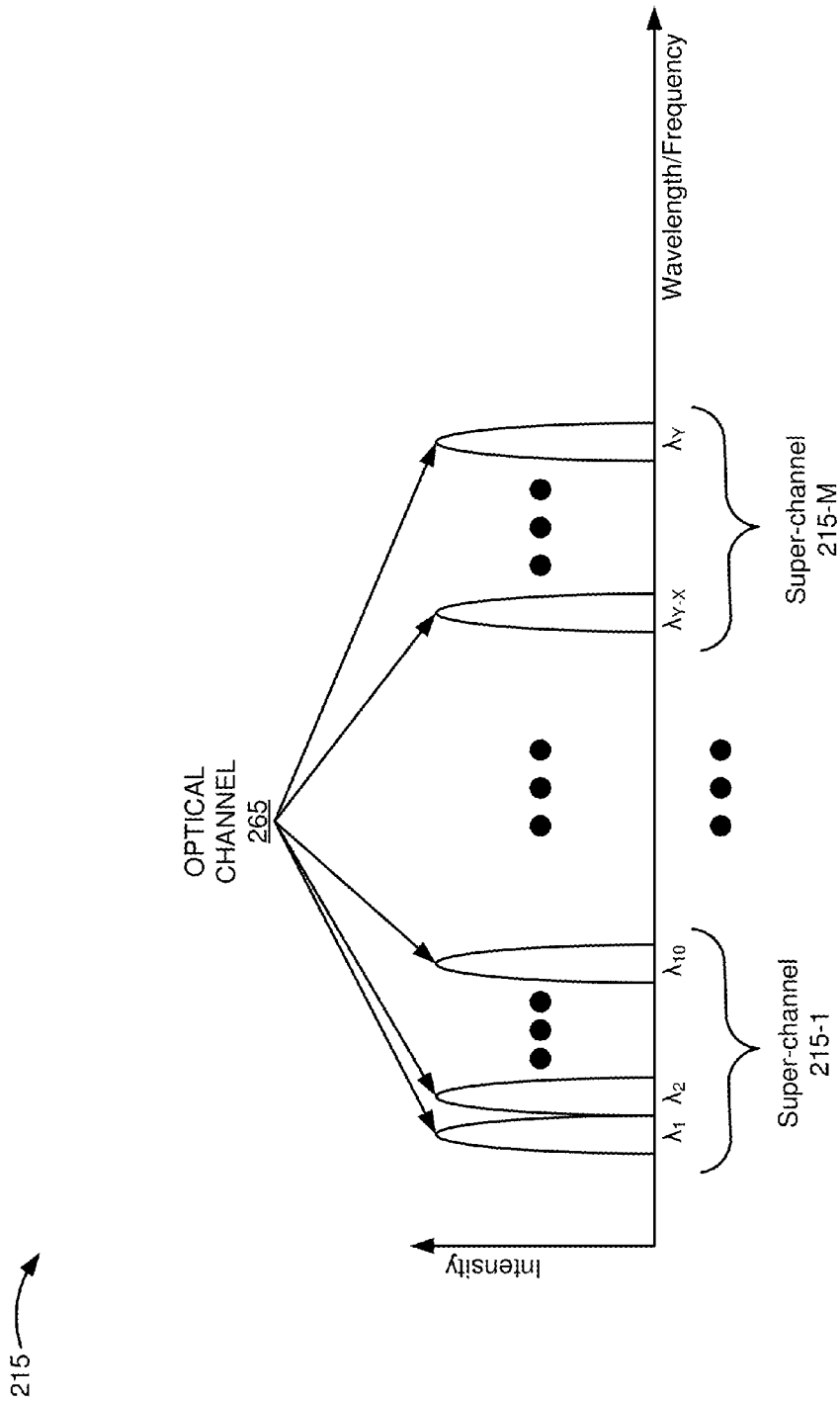

FIG. 2B is a diagram of example super-channels 215 that may be monitored and/or configured according to implementations described herein. A super-channel, as used herein, may refer to multiple optical channels that are simultaneously transported over the same optical waveguide (e.g., a single mode optical fiber). Each optical channel included in a super-channel may be associated with a particular optical wavelength (or set of optical wavelengths). Each optical channel included in a super-channel may be associated with multiple subcarriers. Each subcarrier may be associated with a particular optical wavelength. The multiple optical channels may be combined to create a super-channel using wavelength division multiplexing. In some implementations, each optical channel may be modulated to carry an optical signal.

An example frequency and/or wavelength spectrum associated with super-channels 215 is illustrated in FIG. 2B. In some implementations, the frequency and/or wavelength spectrum may be associated with a particular optical spectrum (e.g., C Band, C+ Band, etc.). As illustrated, super-channel 215-1 may include multiple optical channels 265, each of which corresponds to a wavelength λ (e.g., λ1, λ2, through λ10) within a first wavelength band. Similarly, super-channel 215-M may include multiple optical channels 265, each of which corresponds to a wavelength λ (e.g., λY-X through λY) within a second wavelength band. The quantity of illustrated optical channels 265 per super-channel 215 is provided for explanatory purposes. In practice, super-channel 215 may include any quantity of optical channels 265.

Optical channel 265 may be associated with a particular frequency and/or wavelength of light. In some implementations, optical channel 265 may be associated with a frequency and/or wavelength at which the intensity of light carried by optical channel 265 is strongest (e.g., a peak intensity, illustrated by the peaks on each optical channel 265). In some implementations, optical channel 265 may be associated with a set of frequencies and/or a set of wavelengths centered at a central frequency and/or wavelength. The intensity of light at the frequencies and/or wavelengths around the central frequency and/or wavelength may be weaker than the intensity of light at the central frequency and/or wavelength, as illustrated.

In some implementations, the spacing between adjacent wavelengths (e.g., λ1 and λ2) may be equal to or substantially equal to a bandwidth (or bit rate) associated with a data stream carried by optical channel 265. For example, assume each optical channel 265 included in super-channel 215-1 (e.g., λ1 through λ10) is associated with a 50 Gigabit per second ("Gbps") data stream. In this example, super-channel 215-1 may have a collective data rate of 500 Gbps (e.g., 50 Gbps×10). In some implementations, the collective data rate of super-channel 215 may be greater than or equal to 100 Gbps. Additionally, or alternatively, the spacing between adjacent wavelengths may be non-uniform, and may vary within a particular super-channel band (e.g., super-channel 215-1). In some implementations, optical channels 265 included in super-channel 215 may be non-adjacent (e.g., may be associated with non-adjacent wavelengths in an optical spectrum).

Each super-channel 215 may be provisioned in optical network 220 as one optical channel and/or as an individual optical channel. Provisioning of an optical channel may include designating a route for the optical channel through network 200. For example, an optical channel may be provisioned to be transmitted via a set of network devices of network 200. Provisioning may be referred to as "allocating" and/or "allocation" herein.

Figure 2C:
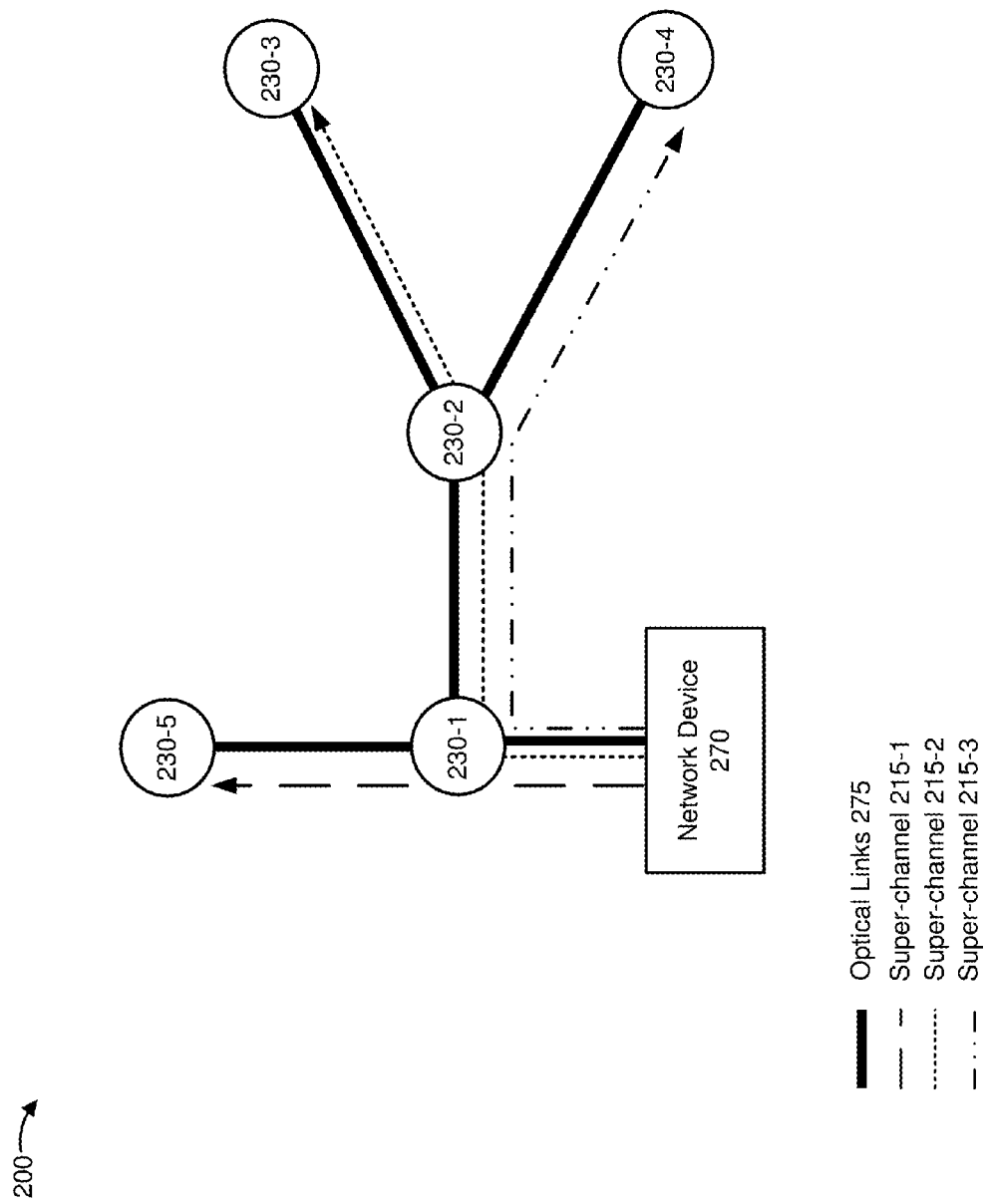

As shown in FIG. 2C, network 200 may include a set of ROADMs 230-1 through 230-5 (e.g., nodes of network 200) that may facilitate communication via network 200. A particular ROADM 230 may utilize a spectral shaping device 240 to perform spectral shaping on an optical signal being routed by the particular ROADM 230, thereby reducing noise accumulation (that results from amplification) and improving propagation of the optical signal relative to an optical signal for which spectral shaping is not performed.

Network device 270 (e.g., Tx device 210, Rx device 260, or the like) may output/receive a set of super-channels 215 to/from ROADM 230-1 via optical link 275 (e.g., an optical fiber). ROADM 230-1 may be connected via a first optical link 275 to ROADM 230-2 and via a second optical link 275 to ROADM 230-5. Furthermore, for example, ROADM 230-2 may be connected via a first optical link 275 to ROADM 230-3 and via a second optical link 275 to ROADM 230-4. The set of super-channels 215 may include a set of individually routable super-channels 215-1 through 215-3.

Figure 3:
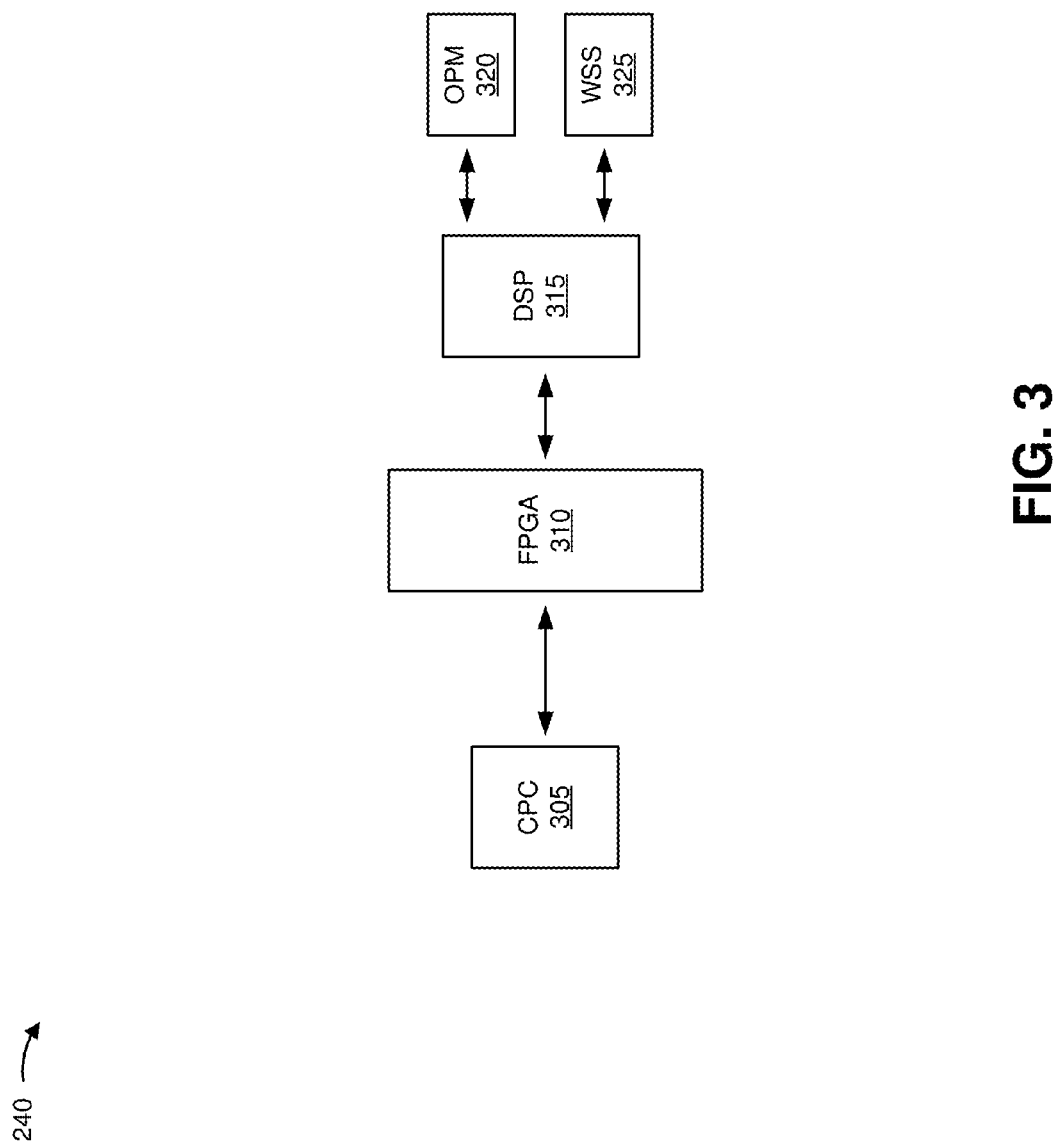
FIG. 3 is a diagram of example components of a spectral shaping device shown in FIG. 2A.

FIG. 3 is a diagram of example components of spectral shaping device 240 shown in network 200 of FIG. 2A. As shown in FIG. 3, spectral shaping device 240 may include a central processor complex (CPC) 305, a field programmable gate array (FPGA) 310, a digital signal processor (DSP) 315, an optical power monitor (OPM) 320, and a WSS 325. In some implementations, one or more of CPC 305, FPGA 310, DSP 315, OPM 320, and WSS 325 may be associated with a common substrate or line card of ROADM 230.

CPC 305 may include, for example, a processing unit that is associated with performing processing functions for WSS 325. For example, CPC 305 may receive a set of sample measurements of an input optical signal (e.g., from OPM 320 and/or DSP 315 via FPGA 310) and may perform one or more analysis techniques on the set of sample measurements to generate an attenuation profile. CPC 305 may provide the attenuation profile to DSP 315/WSS 325 via FPGA 310. Components and/or functionalities of CPC 305 are described in more detail with regard to FIG. 4.

FPGA 310 may include, for example, an interface between CPC 305 and DSP 315. For example, FPGA 310 may facilitate interfacing between DSP 315 and CPC 305.

DSP 315 may include, for example, a digital signal processor or a collection of digital signal processors. In some implementations, DSP 315 may receive data from a data source (e.g., a signal received from OPM 320), process the signal, and output a digital signal associated with the signal. In some implementations, DSP 315 may perform one or more control functions for OPM 320 and/or WSS 325. For example, DSP 315 may receive a trigger to perform spectral shaping and may provide a signal to OPM 320 associated with causing OPM 320 to perform a set of sample measurements of an input optical signal at a particular sample rate (e.g., a 12.5 GHz resolution (coarse) sample measurement rate, a 3.125 GHz resolution (fine) sample measurement rate, or the like). Additionally, or alternatively, DSP 315 may receive an attenuation profile (e.g., from CPC 305) and may cause WSS 325 to apply the attenuation profile to an input optical signal to generate an output optical signal associated with a desired spectral shape.

OPM 320 may include, for example, a set of photodetectors associated with performing a set of sample measurements of an input optical signal to determine a spectral profile of the input optical signal. For example, OPM 320 may perform a set of sample measurements on the input optical signal at a particular sample rate (e.g., a coarse sample measurement rate, a fine sample measurement rate, or the like) and may provide the set of sample measurements to CPC 305 (e.g., via DSP 315 and FPGA 310) for utilization in determining a spectral profile for the input optical signal and determining an attenuation profile to be applied to the input optical signal. In some implementations, OPM 320 may be located downstream of WSS 325 in an optical transmission path. In this case, CPC 305 may account for attenuation performed by WSS 325 using a first attenuation profile when determining a second attenuation profile (e.g., CPC 305 may determine a spectral profile for the input optical signal based on the spectral profile of the output optical signal measured by OPM 320 and the attenuation profile applied to the input optical signal). In this way, OPM 320 may account for multiple different device configurations.

WSS 325 may include, for example, a wavelength selective switch, a wavelength selective power controller, or the like that performs selective attenuation of an input optical signal to generate an output optical signal resembling a desired spectral shape. In some implementations, WSS 325 is associated with a particular attenuation granularity, such as a 12.5 GHz coarse attenuation granularity. In this case, CPC 305 may perform one or more data analysis techniques associated with mapping information from a fine-scan resolution to a coarse-scan resolution to facilitate attenuation at the coarse attenuation granularity.

As indicated above, FIG. 3 is provided merely as an example. Other examples are possible and may differ from what was described with regard to FIG. 3.

Figure 4:
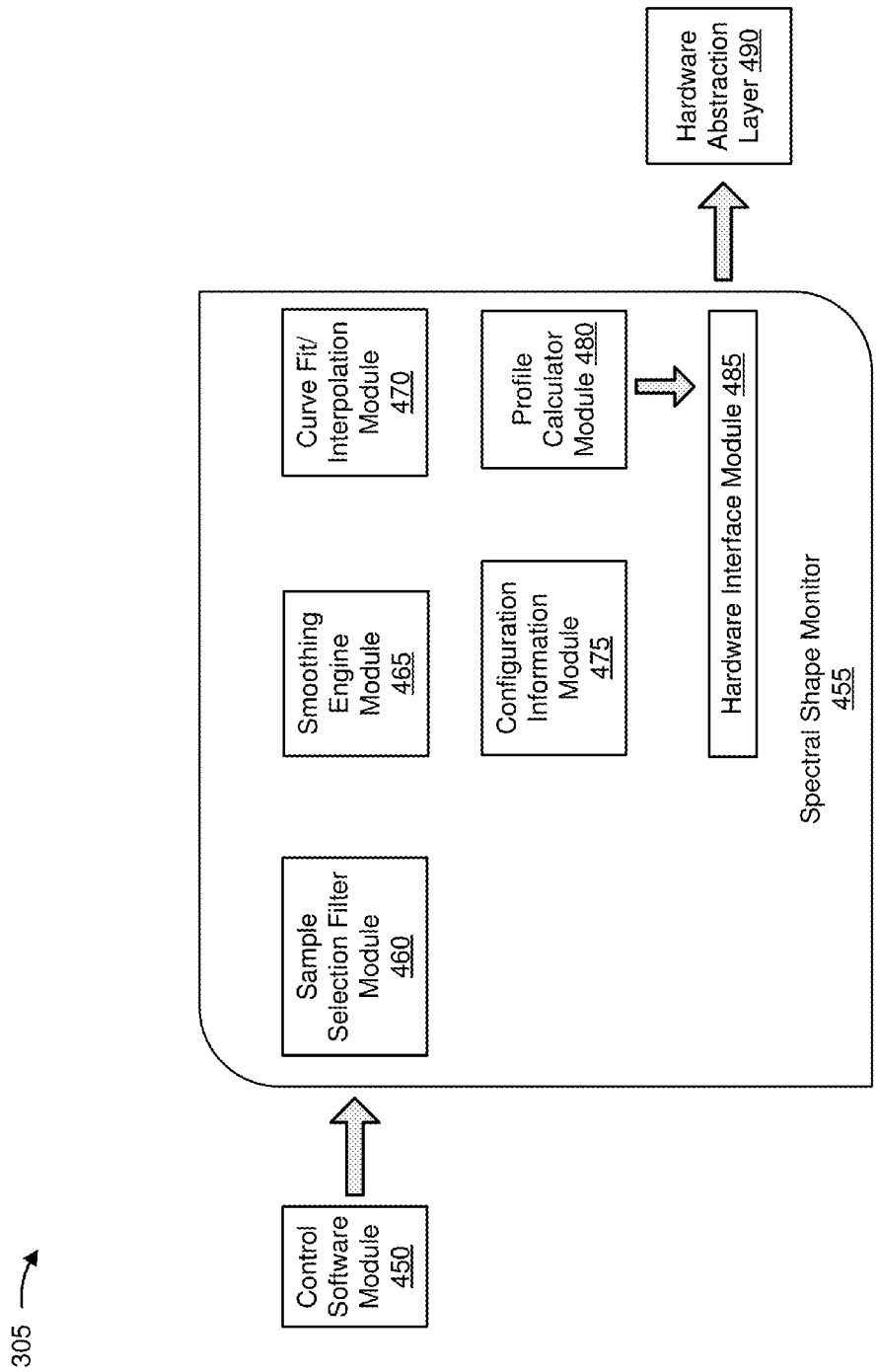
FIG. 4 is a diagram of example components of a central processor complex shown in FIG. 3.

FIG. 4 is a diagram of example components of CPC 305, shown in FIG. 3. As shown in FIG. 4, CPC 305 may include a control software module 450; a spectral shape monitor 455, which may include a sample selection filter module 460, a smoothening engine module 465, a curve fit/interpolation module 470, a configuration information module 475, a profile calculator module 480, and a hardware interface module 485; and a hardware abstraction layer 490.

Control software module 450 may include a component that triggers spectral shaping. For example, control software module 450 may include a timer component that determines that a threshold period of time has elapsed and causes spectral shaping device 240 to perform spectral shaping. Additionally, or alternatively, control software module 450 may detect a threshold change to a total passband optical power (e.g., a total measured power of an optical signal within a particular range of wavelengths/frequencies) and cause spectral shaping device 240 to perform spectral shaping. In some implementations, control software module 450 may be associated with providing information for configuration information module 475. For example, control software module 450 may provide information associated with a channel plan (e.g., wavelength locations for a set of channels that are being utilized for transmitting information via one or more optical signals), a carrier status (e.g., whether a particular channel of a set of channels is being actively utilized to transmit information), a set of sample measurements of an optical signal, or the like.

Spectral shape monitor 455 may include a set of modules, such as sample selection filter module 460, smoothening engine module 465, curve fit/interpolation module 470, configuration information module 475, profile calculator module 480, and hardware interface module 485. For example, spectral shape monitor 455 may receive a set of sample measurements of an input optical signal (e.g., from control software module 450), may determine a spectral profile of the input optical signal, and may determine an attenuation profile for causing the input optical signal to resemble a desired spectral shape as an output optical signal. In some implementations, spectral shape monitor 455 may provide the attenuation profile. For example, spectral shape monitor 455 may provide the attenuation profile (e.g., via hardware interface module 485 and hardware abstraction layer 490) to WSS 325 for WSS 325 to apply to the input optical signal.

Sample selection filter module 460 may include a module associated with distinguishing between a set of used channels and a set of unused channels associated with an input optical signal based on a set of sample measurements of the input optical signal. For example, sample selection filter module 460 may receive the set of sample measurements from OPM module 420 (e.g., via control software module 450), and may determine that a first channel is activated for utilization to transmit information and that a second channel is not activated for utilization in transmitting information. In some implementations, sample selection filter module 460 may receive a sample measurement of a slice of spectrum (e.g., a set of wavelengths) and may determine whether the slice of spectrum includes a channel being utilized for transmitting information. In this way, spectral shape monitor 455 may identify a sample measurement (of a used channel) that may be utilized in determining the attenuation profile.

In some implementations, sample selection filter module 460 may determine whether a slice of spectrum is being utilized based on receiving information associated with a channel plan, an active carrier list, and/or a set of threshold filters from configuration information module 475. For example, sample selection filter module 460 may determine a threshold optical power, satisfaction of which by a sample measurement indicates that the sample measurement is of a used channel. Additionally, or alternatively, sample selection filter module 460 may order the set of sample measurements based on optical power and select a quantity of the set of sample measurements with a greatest optical power.

Smoothening engine module 465 may be associated with smoothening a data set associated with a set of sample measurements. For example, smoothening engine module 465 may receive a data set from sample selection filter module 460 representing optical power measurements for used channels, and may perform one or more data smoothening techniques on the data set to generate a smoothened data set. In this way, spectral shape monitor 455 may account for discontinuities in a set of sample measurements caused by OPM 320, optical signal noise, or the like.

Curve fit/interpolation module 470 may be associated with performing curve fitting and/or interpolation on a data set associated with a set of sample measurements. For example, curve fit/interpolation module 470 may receive a data set from smoothening engine module 465 representing smoothened optical power measurements for used channels, and may perform quadratic curve fitting, linear interpolation, or another technique to determine a spectral profile based on the data set. In this way, spectral shape monitor 455 may determine optical power levels at frequencies/wavelengths between frequencies/wavelengths at which sample measurements were performed.

Configuration information module 475 may store and/or provide information relating to one or more settings and/or configuration parameters for sample selection filter module 460, smoothening engine module 465, curve fit interpolation module 470, or the like. Additionally, or alternatively, configuration information module 475 may include information associated with mapping a sample measurement to a particular channel. For example, configuration information module 475 may store a first mapping for a first channel plan and a second mapping for a second channel plan. In this case, when the first channel plan is being utilized for an input optical signal, configuration information module 475 may provide information identifying the first mapping to facilitate identifying used and/or unused channels.

Profile calculator module 480 may be associated with evaluating a spectral profile to determine an attenuation profile. For example, profile calculator module 480 may compare the spectral profile to a desired spectral profile (e.g., received from configuration information module 475) and determine an attenuation profile that may be applied to an input optical signal (from which the spectral profile is determined) to facilitate providing an output optical signal associated with the desired spectral profile (e.g., a flat spectral profile, a non-flat spectral profile, or the like).

Hardware interface 485 and hardware abstraction layer 490 may include a hardware interface and an abstraction layer associated with abstracting hardware that interfaces with CPC 305. Components of CPC 305 may be agnostic as to the hardware interfacing with CPC 305 and may receive a set of sample measurements from and/or provide an attenuation profile to the hardware without being customized to the hardware. In this way, CPC 305 is less likely to need replacement when a monitoring component or an attenuating component is altered.

As indicated above, FIG. 4 is provided merely as an example. Other examples are possible and may differ from what was described with regard to FIG. 4.

Although components of FIG. 4 are described in terms of hardware or software, components of FIG. 4 may be provided via hardware, firmware, or a combination of hardware and software.

Figure 5:
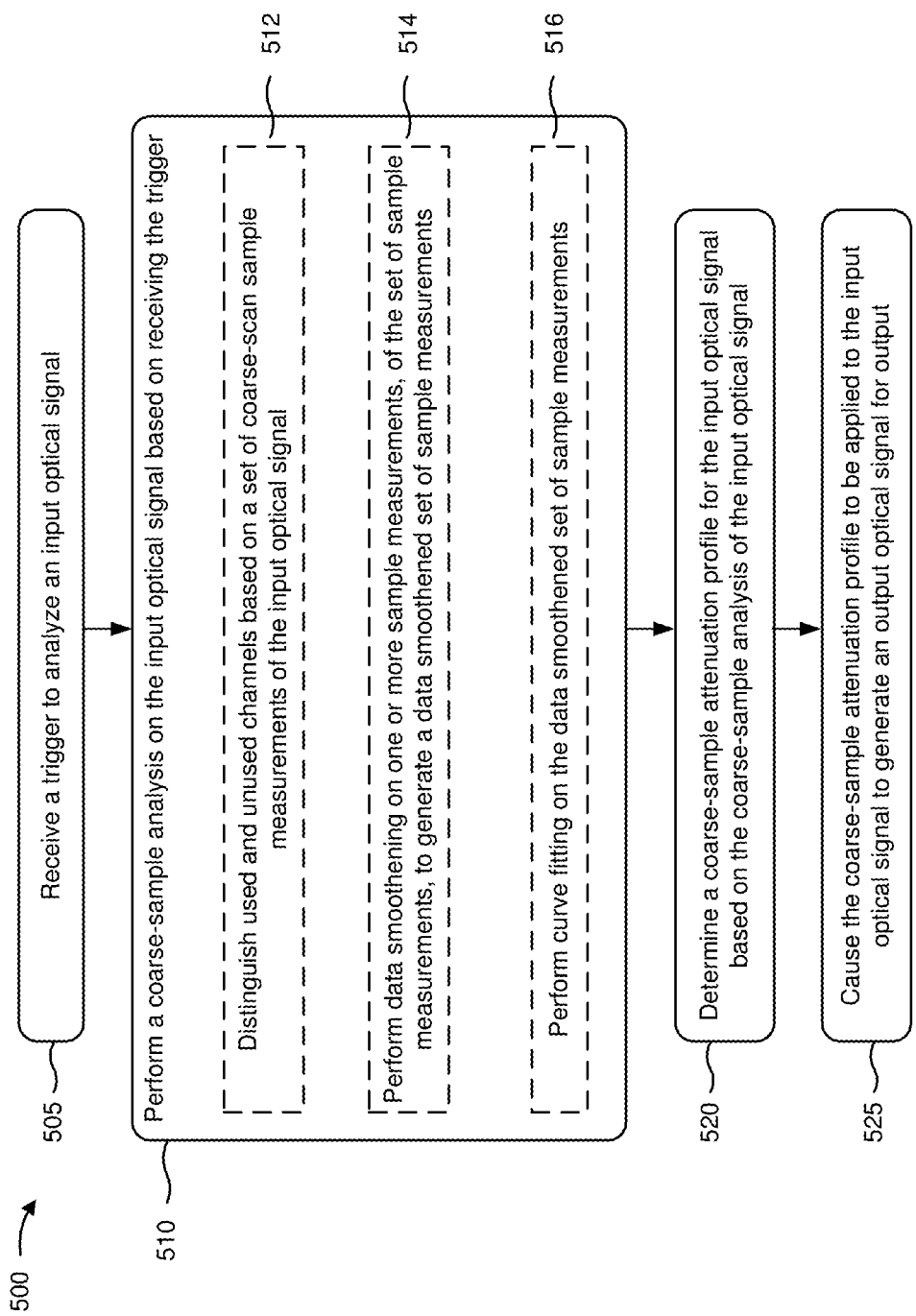
FIG. 5 is a flow chart of an example process for performing coarse-scan spectral shaping of an optical signal in a WDM system.

FIG. 5 is a flow chart of an example process 500 for performing coarse-scan spectral shaping of an optical signal in a WDM system. In some implementations, one or more process blocks of FIG. 5 may be performed by spectral shaping device 240. In some implementations, one or more process blocks of FIG. 5 may be performed by another device or a group of devices separate from or including spectral shaping device 240, such as a network device of network 200 (e.g., Tx device 210, MUX 220, ROADM 230, DEMUX 250, RX device 260, etc.), a component of spectral shaping device 240 (e.g., CPC 305, FPGA 310, DSP 315, OPM 320, WSS 325, etc.), a component of CPC 305 (e.g., control software module 450, spectral shape monitor 455, sample selection filter module 460, smoothening engine module 465, curve fit/interpolation module 470, configuration information module 475, profile calculator module 480, hardware interface module 485, hardware abstraction layer 490, etc.), or the like.

As shown in FIG. 5, process 500 may include receiving a trigger to analyze an input optical signal (block 505). For example, spectral shaping device 240 may receive the trigger to analyze the input optical signal. In some implementations, spectral shaping device 240 may be triggered based on a time-based trigger. For example, when a threshold quantity of time elapses (e.g., 1 second, 1.5 seconds, 10 seconds, etc.), spectral shaping device 240 may be triggered to perform an optical power measurement of the input optical signal. In some implementations, spectral shaping device 240 may receive the trigger to analyze the input optical signal based on detecting a threshold change to a total passband optical power measurement. For example, after determining that a threshold quantity of time has elapsed, spectral shaping device 240 may determine that a total passband optical power has changed by a threshold quantity, and may determine to perform coarse-scan spectral shaping. In this way, spectral shaping device 240 may reduce processing resources utilized by limiting performance of coarse-scan spectral shaping for the input optical signal to when the input optical signal is determined to have altered.

As further shown in FIG. 5, process 500 may include performing a coarse-sample analysis on the input optical signal based on receiving the trigger (block 510). For example, spectral shaping device 240 may perform the coarse-sample analysis on the input optical signal. In some implementations, spectral shaping device 240 may determine a new attenuation profile to be applied to the input optical signal when performing the coarse-sample analysis. For example, spectral shaping device 240 may apply a first attenuation profile to an input optical signal until spectral shaping device 240 detects a threshold change to a spectral profile of the input optical signal. In this case, spectral shaping device 240 may perform coarse-sample analysis of the input optical signal to determine a second attenuation profile to be applied to the input optical signal to cause the output optical signal to resemble a desired spectral shape.

As further shown in FIG. 5 and with regard to process 500, performing the coarse-sample analysis on the input optical signal may include distinguishing used and unused channels of the input optical signal based on a set of coarse-scan sample measurements of the input optical signal (block 512). For example, spectral shaping device 240 may identify a set of used channels of the input optical signal and a set of unused channels of the input optical signal. In some implementations, spectral shaping device 240 may distinguish used and unused spectral slices when distinguishing the used and unused channels. For example, when spectral shaping device 240 performs the set of sample measurements (e.g., coarse sample measurements) on the input optical signal, each sample measurement may represent a slice of spectrum, which spectral shaping device 240 may classify as including a used channel or an unused channel. In this way, spectral shaping device 240 may account for a flexible grid, a poorly calibrated transmitter device, or the like resulting in channels not aligning with sample measurement increments.

In some implementations, spectral shaping device 240 may identify the set of used channels based on a threshold optical power. For example, spectral shaping device 240 may determine one or more sample measurements associated with an optical power satisfying a threshold. Additionally, or alternatively, spectral shaping device 240 may determine the one or more sample measurements based on an ordering of the set of sample measurements based on optical power. For example, spectral shaping device 240 may order the set of sample measurements based on optical power and select a threshold quantity of sample measurements associated with the greatest optical powers.

As further shown in FIG. 5 and with regard to process 500, performing the coarse-sample analysis on the input optical signal may include performing data smoothening on one or more sample measurements, of the set of coarse-scan sample measurements, associated with used channels of the input optical signal to generate a data smoothened set of sample measurements (block 514). For example, spectral shaping device 240 may perform data smoothening on a set of optical powers associated with one or more channels determined to be used for transmitting information. In some implementations, spectral shaping device 240 may apply a weighted moving average to the one or more sample measurements. For example, spectral shaping device 240 may alter one or more optical powers of the one or more sample measurements based on a weighted moving average to generate a data smoothened set of sample measurements.

As further shown in FIG. 5 and with regard to process 500, performing the coarse-sample analysis on the input optical signal may include performing curve fitting on the data smoothened set of sample measurements (block 516). For example, spectral shaping device 240 may perform quadratic curve fitting on the data smoothened set of sample measurements to determine estimated power values occurring in between wavelengths represented by the data smoothened set of sample measurements. In some implementations, spectral shaping device 240 may determine a spectral profile for the input optical signal when performing curve fitting. For example, spectral shaping device 240 may generate a quadratic curve best fitting the data smoothened set of sample measurements as an estimated spectral profile for the input optical signal.

As further shown in FIG. 5, process 500 may include determining a coarse-sample attenuation profile for the input optical signal based on the coarse-sample analysis of the input optical signal (block 520). For example, spectral shaping device 240 may determine the coarse-sample attenuation profile for the input optical signal based on a spectral profile for the input optical signal (e.g., the estimated spectral profile) and a desired spectral shape. The coarse-sample attenuation profile may include a set of attenuation quantities associated with a corresponding set of frequencies/wavelengths. For example, spectral shaping device 240 may generate a coarse-sample attenuation profile that indicates a first quantity of optical power attenuation at a first wavelength and a second quantity of optical power attenuation at a second wavelength.

In some implementations, spectral shaping device 240 may generate the coarse-sample attenuation profile to perform inter-super-channel equalization. For example, spectral shaping device 240 may generate a particular attenuation profile associated with ensuring that a first average optical power of a first super-channel and a second average optical power of a second super-channel are substantially equalized. In some implementations, spectral shaping device 240 may generate the coarse-sample attenuation profile to perform intra-super-channel equalization. For example, spectral shaping device 240 may generate a particular attenuation profile associated with ensuring that a first peak optical power of a first channel is substantially equalized with a second peak optical power of a second channel. In some implementations, spectral shaping device 240 may generate the coarse-sample attenuation profile to perform pre-emphasis. For example, spectral shaping device 240 may generate a particular attenuation profile that ensures that a first channel or super-channel is associated with a greater optical power than a second channel or super-channel. In this case, the first channel or super-channel may be selected for the greater optical power based on being subject to greater attenuation during optical transmission than the second channel or super-channel.

In some implementations, spectral shaping device 240 may determine whether the coarse-sample attenuation profile does not differ from a previous attenuation profile by a threshold amount. For example, spectral shaping device 240 may determine that the coarse-sample attenuation profile does not differ from the previous attenuation profile (that is being applied to the input optical signal) and may determine not to implement the coarse-sample attenuation profile. In this way, spectral shaping device 240 may reduce computing resources utilized to replace the previous attenuation profile with the coarse-sample attenuation profile (e.g., read/write cycles, memory usage, or the like).

As further shown in FIG. 5, process 500 may include causing the coarse-sample attenuation profile to be applied to the input optical signal to generate an output signal for output (block 525). For example, spectral shaping device 240 may apply the coarse-sample attenuation profile to the input optical signal to cause the output optical signal to resemble a desired spectral shape (e.g., a flat spectral shape, a pre-emphasis spectral shape, or the like). In some implementations, spectral shaping device 240 may provide the coarse-sample attenuation profile to WSS 325 to cause WSS 325 to perform attenuation on the input optical signal. For example, spectral shaping device 240 may trigger WSS 325 to utilize the coarse-sample attenuation profile in determining which wavelengths to attenuate and by what quantity of attenuation. In this way, spectral shaping device 240 may provide an output optical signal that resembles a desired spectral profile, thereby improving optical communications by facilitating transmitting an optical signal with a spectral profile that improves SNR, potential transmission distance, or the like relative to an optical signal for which spectral shaping is not performed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
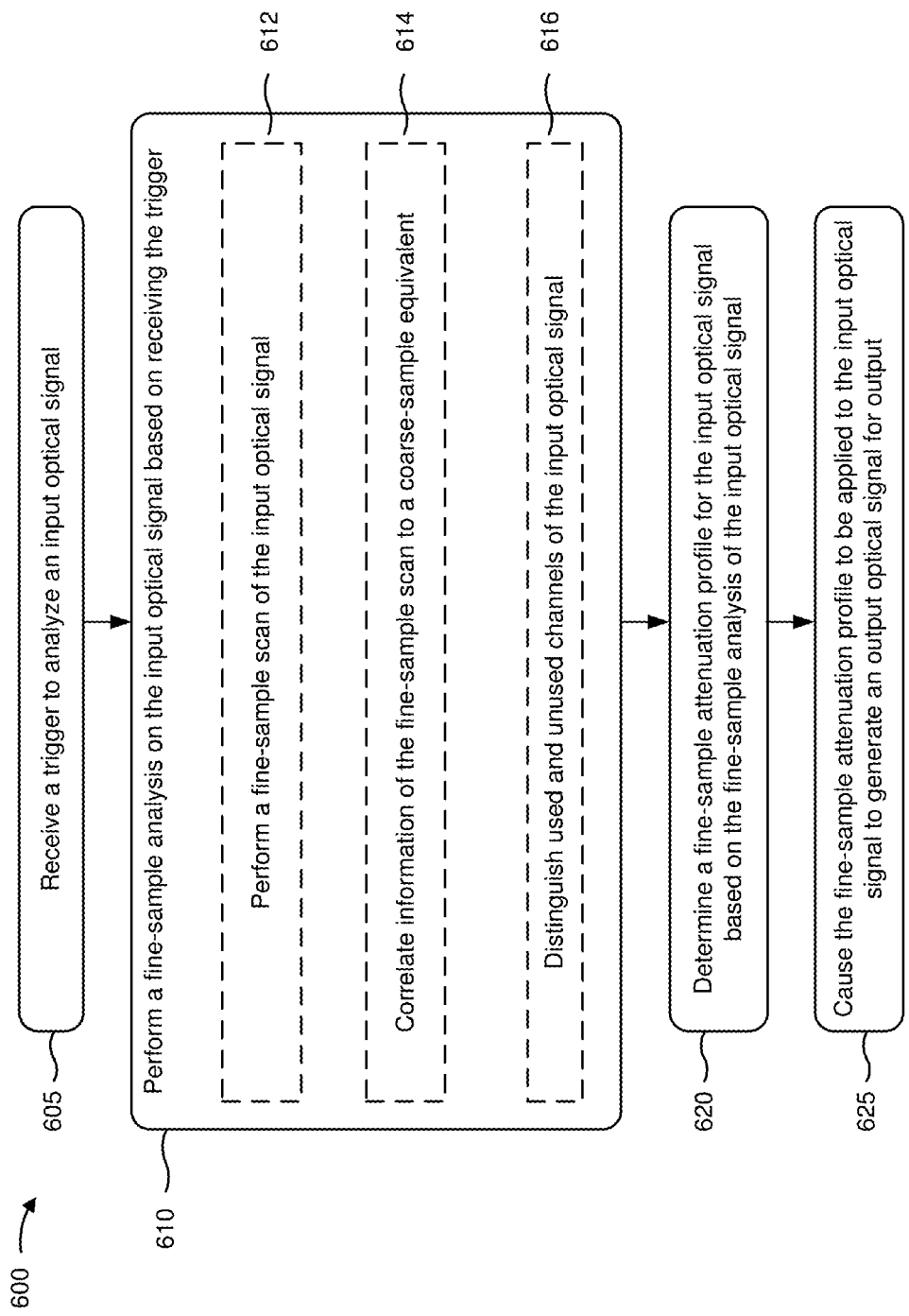
FIG. 6 is a flow chart of an example process for performing fine-scan spectral shaping of an optical signal in a WDM system.

FIG. 6 is a flow chart of an example process 600 for performing fine-scan spectral shaping of an optical signal in a WDM system. In some implementations, one or more process blocks of FIG. 6 may be performed by spectral shaping device 240. In some implementations, one or more process blocks of FIG. 6 may be performed by another device or a group of devices separate from or including spectral shaping device 240, such as a network device of network 200 (e.g., Tx device 210, MUX 220, ROADM 230, DEMUX 250, RX device 260, etc.), a component of spectral shaping device 240 (e.g., CPC 305, FPGA 310, DSP 315, OPM 320, WSS 325, etc.), a component of CPC 305 (e.g., control software module 450, spectral shape monitor 455, sample selection filter module 460, smoothening engine module 465, curve fit/interpolation module 470, configuration information module 475, profile calculator module 480, hardware interface module 485, hardware abstraction layer 490, etc.), or the like.

As shown in FIG. 6, process 600 may include receiving a trigger to analyze an input optical signal (block 605). For example, spectral shaping device 240 may receive the trigger to analyze the input optical signal. In some implementations, spectral shaping device 240 may be triggered based on a time-based trigger. For example, spectral shaping device 240 may determine that a threshold quantity of time (e.g., 1 second, 4 seconds, 400 seconds, etc.) has elapsed and may determine to analyze the input optical signal. In this way, spectral shaping device 240 may perform periodic fine-sample analysis on the input optical signal and use relatively fewer computing resources than if spectral shaping device 240 were configured to perform constant fine-sample analysis.

As shown in FIG. 6, process 600 may include performing a fine-sample analysis on the input optical signal based on receiving the trigger (block 610). For example, spectral shaping device 240 may perform the fine-sample analysis on the input optical signal. In some implementations, spectral shaping device 240 may determine a new attenuation profile when performing fine-sample analysis. For example, spectral shaping device 240 may apply a first attenuation profile to the input optical signal until spectral shaping device 240 performs the fine-sample analysis on the input optical signal and generates a new attenuation profile for application to the input optical signal.

As shown in FIG. 6 and with regard to process 600, performing a fine-sample analysis on the input optical signal may include performing a fine-sample scan of the input optical signal (block 612). For example, spectral shaping device 240 may perform the fine-sample scan of the input optical signal. In some implementations, spectral shaping device 240 may perform a set sample measurements (e.g., of optical power of the input optical signal) at a fine-sample resolution (e.g., 3.125 GHz). For example, spectral shaping device 240 may determine an optical intensity of the input optical signal at a set of spectrum slices associated with the fine-sample resolution. In some implementations, spectral shaping device 240 may perform the set of optical signal power measurements at a set of spectral slices determined based on a channel-to-sample mapping. For example, spectral shaping device 240 may determine a channel plan for the input optical signal and obtain a stored channel-to-sample mapping that is associated with determining when to perform sample measurements to obtain information regarding channels of the input optical signal.

In some implementations, spectral shaping device 240 may select a subset of the sample measurements associated with a threshold optical power. Additionally, or alternatively, spectral shaping device 240 may filter the set of sample measurements to identify a subset of sample measurements associated with the greatest optical power. In some implementations, spectral shaping device 240 may applying a weighting to the subset of sample measurements. For example, spectral shaping device 240 may weight a sample measurement based on an optical power of the sample measurement in using the sample measurement to determine a channel center of a channel measured by the sample measurement. In this way, spectral shaping device 240 may correlate a sample measurement with a channel center (e.g., center frequencies/wavelengths for channels of the input optical signal) to identify an optical power for the channel.

As shown in FIG. 6 and with regard to process 600, performing a fine-sample analysis on the input optical signal may include correlating information of the fine-sample scan to a coarse-sample equivalent (block 614). For example, when WSS 325 is associated with a coarse resolution for attenuation, spectral shaping device 240 may correlate the fine-sample scan measurements to a coarse-sample scan equivalency. In this case, spectral shaping device 240 may map a channel center of a channel (e.g., determined based on the fine-sample scan) to a coarse-sample slice of spectrum (e.g., a 12.5 GHz slice of spectrum) in which the channel occurs. In this way, spectral shaping device 240 may determine which coarse-scan slices of spectrum WSS 325 is to attenuate when attempting to attenuate a particular channel detected via a particular fine-scan slice by OPM 320.

As shown in FIG. 6 and with regard to process 600, performing a fine-sample analysis on the input optical signal may include distinguishing used and unused channels of the input optical signal (block 616). For example, spectral shaping device 240 may identify a set of used channels (e.g., one or more channels that are being utilized for transmission of information) and a set of unused channels (e.g., one or more channels that are not being utilized for transmission of information), as described herein with regard to FIG. 5.

As shown in FIG. 6, process 600 may include determining a fine-sample attenuation profile for the input optical signal based on the fine-sample analysis of the input optical signal (block 620). For example, spectral shaping device 240 may determine the fine-scan attenuation profile for the input optical signal. In some implementations, spectral shaping device 240 may generate a first attenuation profile for used channels (e.g., a partial attenuation profile) and a second attenuation profile for unused channels to determine the fine-scan attenuation profile. In this case, spectral shaping device 240 may interpolate or extrapolate one or more attenuation quantities of the partial attenuation profile to generate the fine-sample attenuation profile.

In some implementations, spectral shaping device 240 may determine an average optical power of one or more used channels based on distinguishing the used and unused channels. For example, spectral shaping device 240 may determine based on the set of fine-scan measurements and the information identifying the used channels, an average optical power for the used channels. In some implementations, spectral shaping device 240 may determine a first attenuation profile for the used channels based on determining the average optical power of the one or more used channels. For example, spectral shaping device 240 may determine a quantity of attenuation to be applied to a particular channel to cause the particular channel to be transmitted at the average optical power, thereby facilitating a flat spectral profile. Additionally, or alternatively, spectral shaping device 240 may modify the attenuation to cause the particular channel to have a different optical power than the average optical power, thereby facilitating a non-flat spectral profile.

In some implementations, spectral shaping device 240 may determine a second attenuation profile for the unused channels based on one or more data analysis techniques. For example, spectral shaping device 240 may perform linear interpolation of the attenuation profile for the used channels to determine a quantity of attenuation for an unused channel located (with respect to wavelength) between two or more used channels. Additionally, or alternatively, spectral shaping device 240 may determine the attenuation profile for the unused channels based on an extrapolation technique. For example, spectral shaping device 240 may extrapolate from an amount of attenuation for one or more used channels to determine a quantity of attenuation for an unused channel not located (with respect to wavelength) between two or more used channels.

In some implementations, spectral shaping device 240 may combine a first attenuation profile for the used channels and a second attenuation profile for the unused channels to generate the fine-scan attenuation profile. For example, spectral shaping device 240 may generate the fine-scan attenuation profile to include attenuation amounts for the used channel (e.g., based on the first attenuation profile) and attenuation amounts for the unused channels (e.g., based on the second attenuation profile). In some implementations, spectral shaping device 240 may perform one or more data smoothening techniques on the fine-scan attenuation profile. For example, spectral shaping device 240 may apply a weighted moving average technique to attenuation quantities of the fine-scan attenuation profile, thereby accounting for errors in interpolation, extrapolation, fine-scan sample measurements, or the like.

In some implementations, spectral shaping device 240 may determine whether the fine-sample attenuation profile does not differ from a previous attenuation profile by a threshold quantity. For example, spectral shaping device 240 may determine that the fine-sample attenuation profile does not differ from the previous attenuation profile (that is being applied to the input optical signal) and may determine not to implement the fine-sample attenuation profile. In this way, spectral shaping device 240 may reduce computing resources utilized to replace the previous attenuation profile with the fine-sample attenuation profile (e.g., read/write cycles, memory usage, or the like).

As further shown in FIG. 6, process 600 may include causing the fine-sample attenuation profile to be applied to the input optical signal to generate an output optical signal for output (block 625). For example, spectral shaping device 240 may apply the fine-sample attenuation profile to the input optical signal to generate the output optical signal. In this way, spectral shaping device 240 may facilitate intra-super-channel equalization, inter-super-channel equalization, selective pre-emphasis, or the like. By providing an output optical signal that resembles a particular (desired) spectral shape, spectral shaping device 240 may improve optical communications by improving SNR, potential transmission distance, or the like.

In this way, spectral shaping device 240 may perform fine-scan spectral shaping thereby facilitating intra-super-channel equalization or selective pre-emphasis for an optical signal associated with a flexible channel grid.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
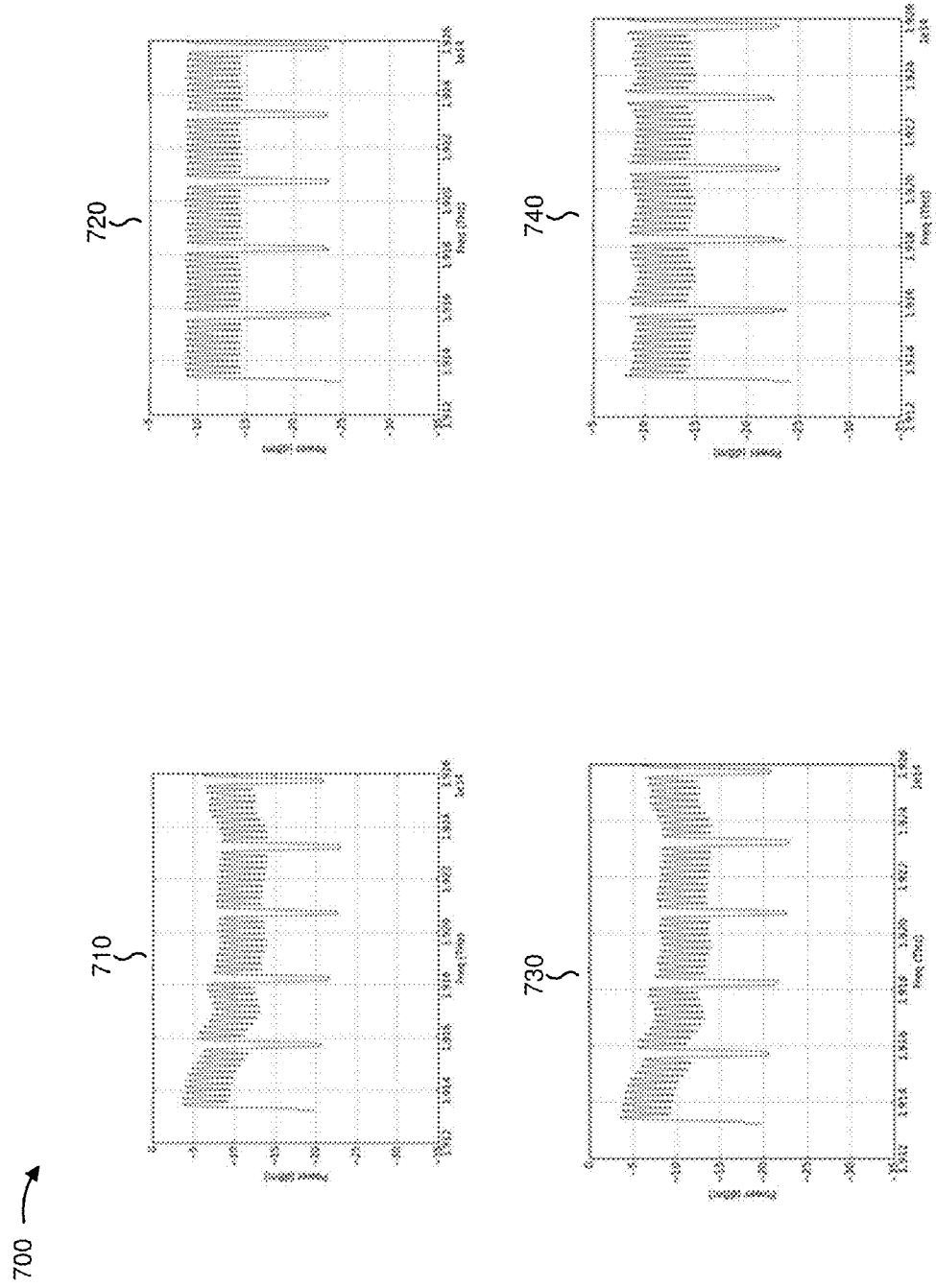
FIG. 7 illustrates example results before and after performing coarse-scan and fine-scan shaping of an optical signal in a WDM system.

FIG. 7 is a diagram of an example implementation 700 relating to example process 500 shown in FIG. 5 and example process 600 shown in FIG. 6. FIG. 7 illustrates example results before and after performing coarse-scan shaping and fine-scan shaping of an optical signal in a WDM system.

As shown in FIG. 7, and by reference number 710, an example of an input optical signal spectral profile is provided. Assume that spectral shaping device 240 performs coarse-scan shaping to cause an output optical signal to resemble a flat spectral profile. As shown by reference number 720, an example of the output optical signal spectral profile is provided based on spectral shaping device 240 performing coarse-scan shaping on the input optical signal. As shown, optical powers for each super-channel of the output optical signal are approximately equalized but optical powers for each channel of a particular super-channel differ as a result of the 12.5 GHz coarse-scan granularity.

As further shown in FIG. 7, and by reference number 730, another example of an input optical signal spectral profile is provided. Assume that spectral shaping device 240 performs fine-scan shaping to cause an output optical signal to resemble a flat spectral profile. As shown by reference number 740, an example output signal spectral profile is provided based on spectral shaping device 240 performing fine-scan shaping on the input optical signal. As shown, optical powers for each super-channel of the output optical signal are approximately equalized and optical powers for each channel of a particular super-channel are approximately equalized as a result of the 3.125 GHz fine-scan granularity.

In some implementations, spectral shaping device 240 may perform both coarse-scan shaping and fine-scan shaping. For example, spectral shaping device 240 may perform coarse-scan shaping and fine-scan shaping in sequence, in parallel, or the like. Additionally, or alternatively, spectral shaping device 240 may perform coarse-scan shaping and fine-scan shaping based on separate triggers. For example, spectral shaping device 240 may perform coarse-scan shaping based on a first timer and an optical power measurement and may perform fine-scan shaping based on a second timer.

As indicated above, FIG. 7 is provided merely as an example. Other examples are possible and may differ from what was described with regard to FIG. 7.

In this way, spectral shaping device 240 may perform spectral shaping to achieve intra-super-channel power equalization and/or inter-super-channel power equalization for an optical signal not conforming to the ITU-T fixed frequency grid. By power equalizing channels of an optical signal, SNR and transmission distance may be improved relative to a non-power equalized optical signal. Additionally, or alternatively, spectral shaping device 240 may perform spectral shaping to achieve a non-equalized spectral shape. By achieving a desired non-equalized spectral shape, spectral shaping device 240 may facilitate power pre-emphasis on portions of an optical signal, thereby overcoming optical signal degradation caused by unequal attenuation during optical signal transmission.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be constructed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeable with "one or more." Where only one item is intended, the term "one" or similar language is used. Also, as used herein, the terms "has," "have," "having," or the like are intended to be open ended terms. Further, the phrase "based on" is intended to mean "based, at least in part, on" unless explicitly stated otherwise.

What is claimed is:

1. A method, comprising:
   performing, by a device, a set of sample measurements of an input optical signal,
      the input optical signal including a set of channels of a super-channel,
      the super-channel grouping the set of channels for routing as a single transport entity,
      the set of channels having a non-uniform spacing;
   performing, by the device, an analysis on the set of sample measurements of the input optical signal,
      the analysis including identifying a channel, of the set of channels, in a sample measurement, of the set of sample measurements, based on the set of sample measurements based on an optical power of one or more sample measurements, of the set of sample measurements;
   determining, by the device, a spectral profile for the input optical signal based on the analysis of the set of sample measurements of the input optical signal;
   determining, by the device, an attenuation profile for the input optical signal based on the spectral profile for the input optical signal and a particular spectral shape,
      the attenuation profile including an attenuation of the channel; and
   applying, by the device, the attenuation profile to the input optical signal to generate an output optical signal with the particular spectral shape.

2. The method of claim 1, where the particular spectral shape is a configurable spectral shape;
   the method further comprising:
   selecting the particular spectral shape; and
   generating an attenuation profile associated with causing the output optical signal to resemble the particular spectral shape based on selecting the particular spectral shape.

3. The method of claim 1, where performing the analysis comprises:
   performing a weighted moving average technique on a subset of the set of sample measurements,
      the subset of the set of sample measurements being one or more sample measurements that include a particular channel, of the set of channels, being utilized for transmission of information.

4. The method of claim 1, where performing the analysis comprises:
   performing a curve-fitting technique on a subset of the set of sample measurements to estimate an optical power for a set of slices of spectrum not including one or more channels, of the set of channels, being utilized for transmission of information,
      the subset of the set of sample measurements being one or more sample measurements that include a channel, of the set of channels, being utilized for transmission of information; and
   determining the spectral profile for the input optical signal based on performing the curve-fitting technique.

5. The method of claim 1, where performing the set of sample measurements comprises:
   performing the set of sample measurements at a 3.125 Gigahertz (GHz) scan resolution,
   a fine-scan resolution being more granular than a 12.5 GHz scan resolution; and
   where performing the analysis on the set of sample measurements comprises:
   identifying a 12.5 GHz scan resolution equivalency for a channel center of a channel, of the set of channels, based on the set of sample measurements at the 3.125 GHz scan resolution,
      the 12.5 GHz scan resolution scan equivalency indicating a slice of spectrum at which to apply an attenuation, of the attenuation profile, at a 12.5 GHz attenuation resolution to the channel.

6. The method of claim 1, further comprising:
   receiving a trigger to update the attenuation profile,
      the trigger being associated with at least one of:
         a time-based trigger, or
         a change in an optical power of the input optical signal; and
   where the analysis is performed on the set of sample measurements after receiving the trigger.

7. An optical device, comprising:
   a spectral shaping device configured to:
   perform a set of sample measurements of a set of slices of spectrum utilized by an input optical signal;
   perform an analysis of the input optical signal to determine an attenuation profile,
      the analysis including identifying a channel in a particular slice of spectrum, of the set of slices of spectrum, based on an optical power of a sample measurement, of the set of sample measurements, satisfying a threshold;
   apply the attenuation profile to the input optical signal to generate an output optical signal with a particular spectral shape; and
   provide the output optical signal with the particular spectral shape.

8. The optical device of claim 7, where, when applying the attenuation profile to the input optical signal, the spectral shaping device is configured to:
   apply the attenuation profile at a coarse-scan resolution; and
   where, when performing the set of sample measurements of the set of slices of spectrum, the OPM is configured to:
   perform the set of sample measurements at a fine-scan resolution,
   the fine-scan resolution being more granular than the coarse-scan resolution.

9. The optical device of claim 8, where, when performing the analysis on the input optical signal, the spectral shaping device is further configured to:
   map the set of sample measurements at the fine-scan resolution to a set of attenuations, of the attenuation profile, at the coarse-scan resolution.

10. The optical device of claim 8, where the fine-scan resolution is an approximately 3.125 Gigahertz (GHz) resolution; and where the coarse-scan resolution is an approximately 12.5 GHz resolution.

11. The optical device of claim 8, where, when performing the set of sample measurements, the spectral shaping device is configured to:

perform a first set of sample measurements at the fine-scan resolution; and perform a second set of sample measurements at the coarse-scan resolution, the spectral shaping device being configured to perform the analysis based on the first set of sample measurements or the second set of sample measurements.

12. The optical device of claim 7, where the spectral shaping device is configured to:

determine that the attenuation profile satisfies a threshold change from another attenuation profile, the other attenuation profile being applied by the spectral shaping device when the spectral shaping device is performing the set of sample measurements; and apply the attenuation profile based on determining that the attenuation profile satisfies the threshold change from the other attenuation profile.

13. The optical device of claim 7, where the spectral shaping device is configured to:

determine an attenuation amount for the particular slice of spectrum based on the attenuation profile; and where, when applying the attenuation profile, the spectral shaping device is configured to:

apply the attenuation amount to the input optical signal to generate the output optical signal, the particular slice of spectrum of the output optical signal being associated with the particular spectral shape.

14. An apparatus comprising:

a wavelength selective switch (WSS) configured to:

apply an attenuation profile to an input optical signal to generate an output optical signal, the input optical signal including a set of channels with a set of optical powers differing by at least a threshold quantity, the output optical signal being associated with the set of channels with the set of optical powers not differing by the threshold quantity, and transmit the output optical signal;

an optical power monitor (OPM), the OPM being located downstream of the WSS in an optical transmission path, the OPM being configured to:

perform a set of sample measurements of the output optical signal;

a processor configured to:

determine a spectral profile for the input optical signal based on the set of sample measurements of the output optical signal, generate the attenuation profile for the WSS based on the spectral profile, and provide the attenuation profile to the WSS for application to another input optical signal.

15. The apparatus of claim 14, where, when generating the attenuation profile, the processor is configured to:

determine a set of attenuation quantities that, when applied to the input optical signal, attenuate the set of channels to the set optical powers not differing by the threshold.

16. The apparatus of claim 14, where, when determining the spectral profile, the processor is configured to:

identify the set of channels based on a channel plan, the channel plan having a non-uniform channel spacing; and determine the spectral profile based on the channel plan.

17. The apparatus of claim 14, where, when determining the spectral profile, the processor is configured to apply, to the set of sample measurements, at least one of:

a sample selection filter technique that distinguishes between used channels and unused channels, a data smoothening technique that modifies the set of sample measurements to reduce noise-related errors, a curve fitting technique that is associated with estimating an optical power at a wavelength of the input optical signal, an interpolation technique that is associated with interpolating an optical power at the wavelength of the input optical signal, or an extrapolation technique that is associated with extrapolating the optical power at the wavelength of the input optical signal.

18. The apparatus of claim 14, where, when generating the attenuation profile, the processor is configured to:

determine a partial attenuation profile based on the set of sample measurements; and extrapolate or interpolate the partial attenuation profile to generate the attenuation profile.

19. The apparatus of claim 14, where, when determining the spectral profile, the processor is configured to:

select a set of slices of spectrum, the set of slices of spectrum corresponding to a subset of the set of sample measurements, the set of slices of spectrum including channels associated with an optical power satisfying a threshold; and generate the spectral profile based on the set of slices of spectrum.

* * * * *